United States Patent
Li et al.

(10) Patent No.: US 9,263,846 B2
(45) Date of Patent: Feb. 16, 2016

(54) SYSTEMS AND METHODS FOR AMPLIFYING SPACE-MULTIPLEXED OPTICAL SIGNALS

(71) Applicant: University of Central Florida Research Foundation, Inc., Orlando, FL (US)

(72) Inventors: Guifang Li, Orlando, FL (US); Ibrahim T. Ozdur, Orlando, FL (US); Hong Shu, Hollywood, FL (US); Michael Bass, Vero Beach, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 202 days.

(21) Appl. No.: 13/646,475

(22) Filed: Oct. 5, 2012

(65) Prior Publication Data

US 2013/0088771 A1    Apr. 11, 2013

Related U.S. Application Data

(60) Provisional application No. 61/543,524, filed on Oct. 5, 2011.

(51) Int. Cl.
| | |
|---|---|
| *H01S 3/09* | (2006.01) |
| *H01S 3/23* | (2006.01) |
| *H01S 3/16* | (2006.01) |
| *H04J 14/02* | (2006.01) |
| *H04J 14/04* | (2006.01) |
| *G02B 6/02* | (2006.01) |

(Continued)

(52) U.S. Cl.
CPC ............... *H01S 3/067* (2013.01); *H01S 3/061* (2013.01); *H01S 3/09* (2013.01); *H01S 3/2308* (2013.01); *H04J 14/00* (2013.01); *H04J 14/04* (2013.01); *G02B 6/02042* (2013.01); *G02B 6/262* (2013.01); *H01S 3/005* (2013.01); *H01S 3/0064* (2013.01); *H01S 3/0617* (2013.01); *H01S 3/0941* (2013.01); *H01S 3/1608* (2013.01); *H01S 3/1618* (2013.01); *H01S 3/175* (2013.01)

(58) Field of Classification Search
CPC .......... H01S 3/09; H01S 3/061; H01S 3/2308; H01S 3/1608; H01S 3/1618; H01S 3/175; G02B 6/02042; G02B 6/264; H04J 14/02; H04J 14/04; H04J 14/05
USPC ........................................... 359/333, 343, 349
See application file for complete search history.

(56) References Cited

U.S. PATENT DOCUMENTS 5,208,699 A * 5/1993 Rockwell et al. ............. 359/338
7,042,631 B2 * 5/2006 Smith et al. .................. 359/333

(Continued)

OTHER PUBLICATIONS

Ozdur, Shu, Bass and Li, "Think Outside the Fiber: Imaging Amplifier for Space-Multiplexed Optical Transmission", IEEE Photonics Journal, vol. 4, No. 5, published Jul. 11, 2012, pp. 1316-1324.*

(Continued)

*Primary Examiner* — Eric Bolda
(74) *Attorney, Agent, or Firm* — William Greener; Bond, Schoeneck & King, PLLC

(57) ABSTRACT

In one embodiment, an optical system for amplifying space-multiplexed optical signals includes an input fiber that propagates multiple spatially-separated optical signals and a bulk amplifier formed of a doped material that receives the multiple spatially-separated optical signals and simultaneously amplifies those signals to generate multiple amplified signals.

28 Claims, 13 Drawing Sheets

(51) Int. Cl.
*G02B 6/26* (2006.01)
*H01S 3/067* (2006.01)
*H01S 3/06* (2006.01)
*H04J 14/00* (2006.01)
*H01S 3/0941* (2006.01)
*H01S 3/17* (2006.01)
*H01S 3/00* (2006.01)

(56) References Cited

U.S. PATENT DOCUMENTS

| | | | | |
|---|---|---|---|---|
| 2002/0173417 | A1* | 11/2002 | Myers et al. | 501/64 |
| 2011/0274435 | A1* | 11/2011 | Fini et al. | 398/139 |
| 2013/0070330 | A1* | 3/2013 | Ryf | 359/334 |
| 2013/0163072 | A1* | 6/2013 | Chang et al. | 359/341.3 |
| 2013/0236175 | A1* | 9/2013 | Sethumadhavan et al. | 398/55 |

OTHER PUBLICATIONS

Inao et al., "Multicore Optical Fiber", Optical Fiber Communication, 1979 OSA Technical Digest Series paper WBI (1979).
Yehia, et al., "Multiple-Imaging in 2-D MMI Silicon Hollow Waveguides", IEEE Photonics Technology Letters, vol. 16, No. 9, Sep. 2004.
Khalil, et al., "Two-Dimenstional Multimode Interference in Integrated Optical Structures", Institute of Physics Publishing, Journal of Optics A: Pure and applied Optics 6 (2004).
Zhu, et al., "Seven-Core multicore Fiber Transmissions for Passive Optical Network", Optics Express, May 24, 2010, vol. 18, No. 11.
Zhu, et al., "112-Tb/s Space-Division Multiplexed DWDM Transmission with 14-b/s/Hz Aggregate Spectral Efficiency over a 76.8-km Seven-Core Fiber", Optics Express; Aug. 15, 2011, vol. 19, No. 17.
Abedin, et al., "Amplification and Noise Properties of an Erbium-doped Multicore Fiber Amplifier", Optics Express, Aug. 15, 2011, vol. 19, No. 17.
Shieh, et al., "Coherent Optical OFDM: theory and design", Optics Express, vol. 16, No. 2, Jan. 9, 2008.
G. Li, "Recent advances in coherent optical communication" Adv. Opt. Photon, 1, 279-307 (2009).
T. S. S. Inao, et al., "Multicore optical fiber," Optical Fiber Communication, 1979 OSA Technical Digest Series paper WB1 (1979).
Yaman, et al. "Long distance transmission in few-mode fibers," Opt. Express 18, 13250-13257 (2010).
Wu, et al., "Fluorescence Lifetime and 980nm pump Energey Transfer Dynamics in Ergium and Ytterbium Co-Doped Phosphate Laser Glasses", Proceedings of SPID vol. 4968, 11-17 (2003).
Bai, et al., "Multimode Fiber Amplifier with Tunable Modal Gain Using a Reconfigurable Multimode Pump," Opt. Express 19, 16601-16611 (2011).
Hageman, et al., "Scalable Side-Pumped, Gain-Guided Index-Antiguided Fiber Laser", J. Opt. Soc. Am B. 27, 2451-2459. (2010).
Kawanishi, et al., "3 Tbit/s (160 Gbitls 19 channel) optical TDM and WDM transmission experiment," Electronics Letters 35 826-827 (1999).
Myslinski, et al., "Performance of High-Concentration Erbium-Doped Fiber Amplifiers" Photonics Technology Letters, IEEE 11, 973-975 (1999).
Roberts, et al., "Performance of Dual-Polarization QPSK for Optical Transport Systems" J. Lightwave Techonol. 27, 546-3559 (2009).
Shu, et al., "Three-Dimensional Computer Model for Simulating Realistic Solid-State laser", Appl Opt. 46, 4687-5697 (2007).
Shu, et al., "Numerical Modeling of Alkali Vapor Lasers", Opt. Express 19, 19875-19885 (2011).
Tacceo, et al., "Diode-Pumped Bulk Ergium-ytterbium Lasers", Applied Physics B: Lasers and Optics 63, 425-436 (1996).
Tanguy, et al., "Modelling of the Erbium-Ytterbium Laser", Optics Communications 153, 172-183 (1998).

* cited by examiner

SYSTEMS AND METHODS FOR AMPLIFYING SPACE-MULTIPLEXED OPTICAL SIGNALS

CROSS-REFERENCE TO RELATED APPLICATION

This application claims priority to co-pending U.S. Provisional Application Ser. No. 61/543,524, filed Oct. 5, 2011, which is hereby incorporated by reference herein in its entirety.

BACKGROUND

Fueled by emerging bandwidth-hungry applications and increases in computer processing power, internet traffic has sustained exponential growth in recent years. Different multiplexing techniques such as time-, wavelength-, and polarization-division multiplexing have been investigated in detail, both theoretically and experimentally, to manage this growth. Another technique for a higher link capacity that has been considered is increasing the fiber count in a fiber cable. Recently, space-multiplexed optical transmission, for example using multimode and multi-core fibers, has attracted great interest due to its ability to multiply fiber capacity. Multimode fibers comprise a single large area core that enables many spatial modes to travel inside, and multi-core fibers comprise several cores. Unfortunately, space-multiplexed optical transmission remains limited to several tens of kilometers due to the lack of a practical amplification technique.

It is clear that commercial erbium-doped fiber amplifiers (EDFAs) cannot be used in space-multiplexed transmission. The basic reason for this is that commercial EDFAs are based on single-mode fibers, which have only one degree of freedom (i.e., one spatial mode) while multimode and multi-core fibers have multiple (e.g., many) degrees of freedom. A straightforward way to provide signal amplification for a multi-core fiber is to separate the cores and then amplify each core individually using separate, dedicated single-mode EDFAs. This method increases the degrees of freedom but also increases the number of components that are required by a factor equal to the number of cores (N). This means that there needs to be N times the pump sources, N times the wavelength-division multiplexing (WDM), N time the erbium-doped fibers (EDFs), and N times the electronics. It would be desirable to avoid such multiplicity of components.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, conventional amplifiers cannot be used for space-multiplexed transmission. Disclosed herein, is a new amplification technique, referred to as imaging amplification, for space-multiplexed optical transmission, for example using multimode fiber (MMF) or multi-core fiber (MCF). In this imaging amplification technique, the facet of an input multimode or multi-core fiber is mapped or imaged to the facet of an output fiber after passing through an amplifying region. In this manner, the technique exploits the parallelism in bulk optics to provide the additional degrees of freedom necessary for the amplification of the signals.

In the following disclosure, various embodiments are described. It is to be understood that those embodiments are example implementations of the disclosed inventions and that alternative embodiments are possible. All such embodiments are intended to fall within the scope of this disclosure.

Figure 1:
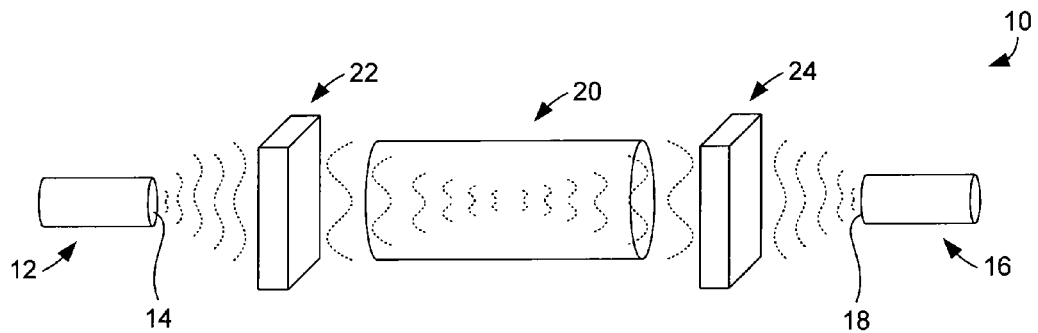
FIG. 1 is a schematic drawing of a first embodiment of an optical system that provides amplification to space-multiplexed optical signals.

A general schematic of an embodiment of an imaging amplifier 10 is illustrated in FIG. 1. As is shown in FIG. 1, the signal from an output facet 14 of an input fiber 12, which can be a multimode fiber or a multi-core fiber, is imaged onto an input facet 18 of a similarly configured output fiber 16 after passing through a bulk amplifier 20. Imaging systems 22 and 24 are used to focus and collimate the beam through the center of the bulk amplifier 20 and then couple the signal back to the output fiber 16. The bulk amplifier 20 can comprise a single piece of glass that contains an appropriate dopant, such as those discussed later in this disclosure. The design of the imaging systems 22, 24 for multimode fibers are relatively straightforward and can be single lens pairs. The design of the imaging systems 22, 24 for multi-core fibers may be more complex and optimization may be required in order to have low pump power. A simple method to image the output facet of a multi-core fiber onto another multi-core fiber is to use a 4-f configuration for the optical system (see FIG. 23).

Figure 2A:
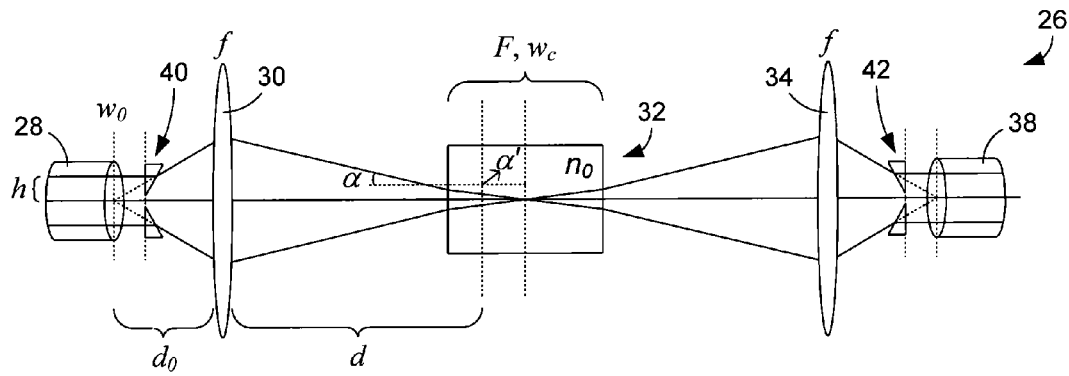
FIG. 2A is a schematic drawing of a second embodiment of an optical system that provides amplification to space-multiplexed optical signals.

FIG. 2A illustrates an embodiment of an optical system 26 that was used in simulations described below. As is shown in FIG. 2A, the system 26 comprises an input fiber 28, which can be a multimode fiber or a multi-core fiber, a first imaging system in the form of a first lens 30, a bulk amplifier 32, a second imaging system in the form of a second lens 34, and an output fiber 38, which can also be a multimode fiber or a multi-core fiber. The core pitch (h) is assumed to be 40 microns (μm) and the beam waist at the output of the input fiber 28 is 5 μm. The beams exiting the input fiber 28 are tilted by using a first wedge prism 40, which enables the beams to cross each other in a central region of the bulk amplifier 32 in which pump light can be focused. After passing through the wedge prism 40, the beams are sent to the first lens 30 whose focal length (f) is assumed to be 5 millimeters (mm). The distance ($d_0$) between the input fiber 28 and the first lens 30 is approximately 5.3 mm. After passing through the lens 30, the beams are directed to a focusing point (d) of approximately 73 mm with an angle ($\alpha$) of approximately 0.75°. The refractive index ($n_a$) and the length (L) of the bulk amplifier 32 (gain medium) are 1.518 mm and 10 mm, respectively. The index change results in a refraction of the input beam to a new tilt angle of 0.51° inside the amplifier 32. The beam waist size ($w_c$) at the center of the bulk amplifier 32 is 70 μm. The overall fiber-to-fiber distance of the system 26 is approximately 160 mm.

Figure 2B:
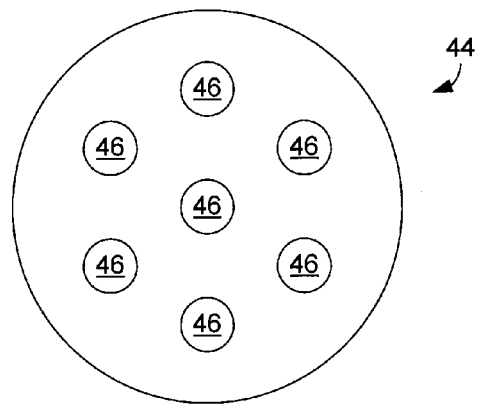
FIG. 2B is an end view of a multi-core optical fiber that was used in the system of FIG. 2A.

In the simulation, angularly symmetrical seven-core fibers were used. FIG. 2B shows an example seven-core fiber 44 that includes seven spaced cores 46. The independent beams from the seven-core fiber are spatially overlapped (multiplexed) at the center of the amplifier 32 in order to increase the overlap of the pump and signal. After the amplification, the signal is spatially demultiplexed by using the second lens 34 and the signal is coupled to the output fiber 38 after passing through a second wedge prism 42. The amplifier 32 can be side pumped or longitudinally (parallel) pumped by using a single pump diode or an array of pump diodes.

$Er^{3+}$ ions are typically used in fiber amplifiers because their emission wavelength is located in the optical communication window. A typical erbium doped fiber has a doping concentration around $20 \times 10^{24}$ $Er^{+3}$ ions/m³, which can result in tens of decibels (dBs) of gain over several meters. Because the length of a bulk amplifier is preferably shorter (e.g., a few centimeters), higher doping concentrations are needed in order to obtain high gain. However, cluster and ion pair phenomena can limit the $Er^{+3}$ doping concentration, which can result in poor absorption of the pump light. In order to increase the pump absorption, $Yb^{3-}$ ions can be used whose absorption cross-section is several times higher than $Er^{3+}$ ions. In the simulations described herein, Er—Yb ions hosted in a phosphate glass were chosen because the energy transfer efficiency of phosphate glass is higher than that of other host materials.

Figure 3:
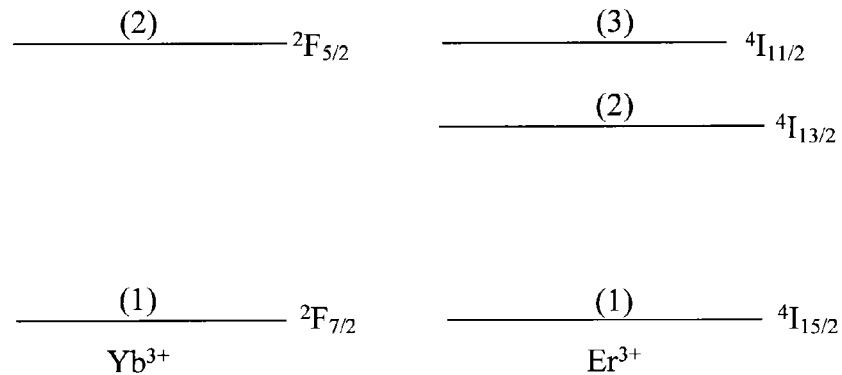
FIG. 3 is a simplified energy level diagram of a Yb—Er system.

An energy level diagram of an Er—Yb system is shown in FIG. 3. The population of the energy levels can be written as:

$$N_{yb}^1 + N_{yb}^2 = N_{yb} \quad (1)$$

$$N_{er}^1 + N_{er}^2 + N_{er}^3 = N_{er} \quad (2)$$

In the above equations, $N^1_{yb}$ and $N^2_{yb}$ are the $Yb^{3+}$ ion populations of ions at the lower and upper energy states, $N_{er}^1$, $N_{er}^2$, and $N_{er}^3$ are the $Er^{3+}$ ion populations at the $^4I_{15/2}$, $^4I_{13/2}$, and $^4I_{11/2}$ energy levels, and $N_{er}$ and $N_{yb}$ are the total doping concentrations of $Er^{3+}$ and $Yb^{3+}$ ions.

After applying the appropriate approximations about the energy level depletion and de-excitation rates, the rate equations of the Er—Yb systems can be simplified to:

$$0 = \sigma_{yb} N_{yb} \Phi_p - k N_{yb}^2 (N_{er} - N_{er}^2) - \frac{N_{yb}^2}{\tau_{yb}} \quad (3)$$

$$0 = k N_{yb}^2 (N_{er} - N_{er}^2) - \sigma_{er}(2N_{er}^2 - N_{er})\Phi_s - \frac{N_{er}^2}{\tau_{er}} \quad (4)$$

where $\sigma_{yb}$ is the ytterbium absorption cross section at the pump wavelength ($\sigma_{yb}$ is $14.1 \times 10^{-21}$ cm² at 980 nm) and $\sigma_{er}$ is the erbium emission cross-section at the signal wavelength ($\sigma^{er}$ is $8.0 \times 10^{-21}$ cm² at 1532 nm). $\Phi_p$ and $\Phi_s$ are the pump and signal photon fluxes, respectively, k is the energy transfer coefficient from $^2F_{5/2}$ to $^4I_{11/2}$, and $\tau_{yb}$ and $\tau_{er}$ are the lifetimes of the $^2F_{5/2}$ and $^4I_{13/2}$ states of $Yb^{3+}$ and $Er^{3+}$ ions ($\tau_{yb}$ and $\tau_{er}$ are 1.5 and 9 milliseconds (ms) respectively).

The above steady state rate equations can be solved analytically to obtain the population inversion $$\Delta N(x,y,z) = N_{er}^2(x,y,z) - N_{er}^1(x,y,z) \quad (5)$$

and the saturated gain coefficient is then $$g(x,y,z) = \sigma_{er} \cdot \Delta N(x,y,z) \quad (6)$$

The saturated gain coefficient shown above can then be entered into the following paraxial wave equation:

$$2ik_0 n_0 \frac{\partial A(x,y,z)}{\partial z} = \frac{\partial^2 A(x,y,z)}{\partial x^2} + \frac{\partial^2 A(x,y,z)}{\partial y^2} + k_0^2 \left[ i\frac{n_0}{k_0} g(x,y,z) + n^2(x,y,z) - n_0^2 \right] \cdot A(x,y,z) \quad (7)$$

In Equation (7), $k_0$ is the wave number in a vacuum and $n_0$ is the refractive index. $n_0$ was set to be the refractive index of the gain medium, which is 1.518, and n(x,y,z) was also assumed to be 1.518, which means that there is no thermal lensing or any other index perturbation in the gain medium.

A(x,y,z) is the slowly varying amplitude of the electric field for each of the seven continuous wave (cw) signal laser beams.

The one-way propagation of each signal laser beam from each of the fiber cores through the bulk amplifier was calculated by numerically solving Equation (7). The numerical one-way propagations of each of the seven beams needs to be iterated with each other until the solution converges to the desired accuracy.

For the system that was considered, it is assumed that each core in the multi-core fibers is a single mode core. Therefore, ideally, the signal in each core of the multi-core fibers is an $LP_{01}$ mode beam, which can be well approximated as a $TEM_{00}$ Gaussian beam in free space after exiting the fiber.

In the simulation, the input signal beams at the input plane of the bulk amplifier 32 are all set to be $TEM_{00}$ Gaussian beams, and all the outer input beams are shifted in different directions from the center of the input plane and are tilted so that all the signal beams overlap with each other at the center of the amplifier 32 along the length, as can be seen in FIG. 2A. In addition, the beam waists of all the signal beams used in the simulation including the central beam are at the center of the amplifier 32 along the length, which is where all the signal beams overlap. All the signal beams are focused into the amplifier 32 by the imaging system 26. In the simulation, the location of the beam waists and beam overlap at the center of the amplifier 32 along the length are satisfied very well when there is neither gain nor absorption in the phosphate glass, and the beam waist radius is 70 μm for all the signal beams. The presence of gain in the phosphate glass changes the situation, but not significantly.

The tilting of the outer input $TEM_{00}$ Gaussian beams are realized by introducing a phase factor to each of the outer beams at the input plane of the phosphate glass gain medium to account for curved laser cavity mirror.

The numerical solution of the scalar paraxial wave equation shown in Equation (7) was conducted. In the beam propagation method (BPM) calculation, the common finite difference method was used for discretization in the transverse x-y plane. The Crank-Nicholson scheme was used for discretization in the z direction, which is the length of the amplifier 32. The saturated gain was accounted for.

Optical power conversion efficiency is an important factor if the above-described amplification is to be applied in a space-multiplexed optical transmission system. It is also important that the signal can be efficiently coupled back to the output fiber after passing the bulk amplifier, which means that it is important to maintain the intensity and phase profiles of the output signals as undistorted as possible, compared to the input signals.

Extensive simulation has been performed to explore how to achieve these goals. It has been determined through simulation that absorbed pump distribution is important for improving the optical power conversion efficiency and reducing the distortion of the signal beams after passing through the bulk amplifier. The favorable absorbed pump distribution can be realized by properly designing the gain medium structure and side pumping configuration.

Figure 4A:
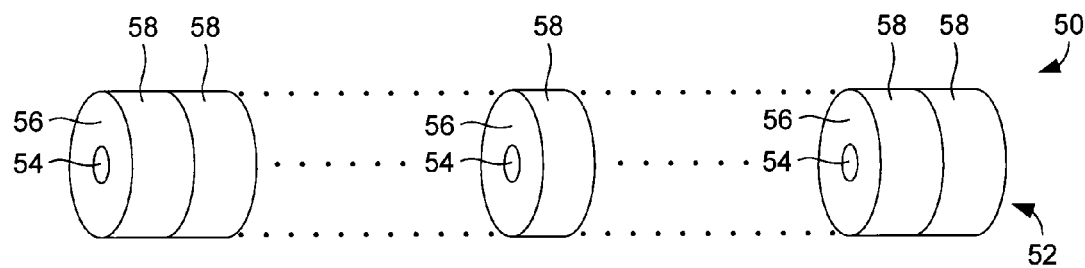
FIGS. 4A and 4B are a side view and an end view, respectively, of a gain medium that was used in a simulation.
Figure 4B:
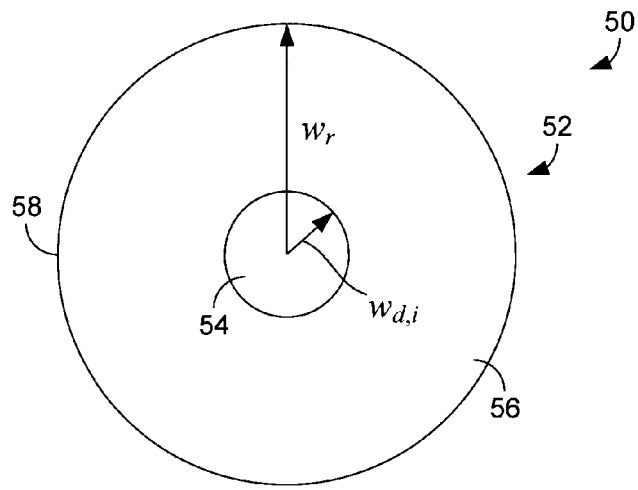

Shown in FIGS. 4A and 4B are schematic diagrams of a gain medium 50 that was used to form the bulk amplifier in the simulation. The gain medium 50 comprises a composite laser rod 52 having a central core 54 that is surrounded by an outer region 56. The rod 52 is different from the common composite laser rod. The core 54 (with a radius of $w_{d,i}$ for the ith segment) is phosphate glass doped with Er and Yb ions and the outer region 56 (with outer radius of $w_r$) is un-doped pure phosphate glass. From FIG. 4A it can be seen that the gain medium 50 is composed of multiple (e.g., 10) segments 58, with each segment having a structure shown in FIG. 4B. The outer radius $w_r$ is the same for all the segments 58 as shown in FIG. 4A, but the radius of the doped cores 54 ($w_{d,1}$, $w_{d,2}$, ..., $w_{d,i}$ ...) can vary from segment to segment.

A side pumping scheme is suitable for delivering the pump light from diode lasers into the gain medium 50 and diode lasers producing multiple spatial mode output could be used as the pump source. It may be convenient to vary and adjust the pump power delivered to each segment 58 of the gain medium. Therefore, the absorbed pump power can be conveniently controlled and adjusted as desired for each of the segments 58 of the gain medium 50.

If the cylindrical surface of the gain medium 50 is highly reflective for pump light, except the entrance window for the pump, it is possible for the pump light to bounce back and forth many times in the rod 52 to increase the effective absorption length. This improves the pump absorption efficiency. Another way to increase that efficiency is to use oblique incidence for the pump along the gain medium 50. If 60° oblique incidence is assumed for the pump, it is possible to reach 80% efficiency for double-pass pump absorption.

The simulation demonstrated that the performance of the gain medium 50 could be optimized by properly adjusting different parameters. These parameters include the thickness of each segment 58, the total length of the gain medium 50, the doping concentration, the radii of the regions doped with Er and Yb ions ($w_{d,1}, w_{d,2}, \ldots, w_{d,i} \ldots$) for different segments in the gain medium, the absorbed pump power in each piece of the gain medium, the transverse size of the signal beams, and the tilt angle for the outer signal beams.

As an approximation in the simulation, it is assumed that the pump absorption efficiency is 100% and the absorbed pump distribution is uniform in the doped core 54 of the gain medium 50. Of course, in a practical amplifier system, the pump absorption efficiency will be less than 100% and the absorbed pump distribution cannot be perfectly uniform.

In the simulated system, the optical power conversion efficiency can generally be improved if the gain medium closer to the output plane of the bulk amplifier is pumped harder than the gain medium closer to the input plane of the bulk amplifier, with the total pump power fixed to a specific value. In addition, the transverse size of the gain region ($w_{d,1}$, $w_{d,2}, \ldots, w_{d,i} \ldots$, the radii of the regions doped with Er and Yb ions) can also be varied along the length of the gain medium, to better match the total intensity profile of all the signal beams. In addition, an unsymmetrical distribution of doped region radius ($w_{d,1}, w_{d,2}, \ldots, w_{d,i} \ldots$) along the length of the gain medium could also be helpful and $w_{d,10}$ (for the last segment of the gain medium) can be smaller than $w_{d,1}$ (for the first segnent). This non-uniform distribution of the transverse size of the gain region helps to further improve the optical power conversion efficiency and reduce the distortion of the signal beams after passing through the bulk amplifier. Furthermore, increasing total pump power and total input power for all the signal beams (by increasing the input power for each signal beam, or by increasing the number of cores and then number of signal beams, or both) is also a useful strategy to improve the optical power conversation efficiency, while maintaining the same amplification for each of the signal beams, e.g., 20 dB.

The amplification of a seven-core fiber has been simulated for an input power of 6 mW from each individual core, which makes the total input power 42 mW. As an ideal case that shall also be the upper limit for the practical case, it is assumed that the pump absorption efficiency is 100% and the absorbed pump distribution is uniform in the doped region in the gain medium as depicted in FIG. 4. By properly adjusting the different parameters for the considered amplifier system the power conversion efficiency has been greatly optimized. In the simulated system, the gain medium closer to the output plane of the bulk amplifier was pumped harder than the gain medium closer to the input plane, with the total pump power fixed to a specific value (15 W here). This non-uniform pump power distribution along the length of the gain medium can generally improve the power conversion efficiency. In addition, the transverse size of the gain region ($w_{d,1}$, $w_{d,2}$, ..., $w_{d,i}$ ..., the radii of the regions doped with Er and Yb ions) was varied along the length of the gain medium and this resulted in better matching between the absorbed pump distribution and the total intensity profile of the seven signal beams. The concentration of erbium ions was determined to be $6.13 \times 10^{26}$ ions/m$^3$ and that of the ytterbium ions was taken to be $1.5 \times 10^{27}$ ions/m$^3$. The length of the amplifier gain medium was determined to be 11.5 mm. This set of erbium and ytterbium doping concentrations are practical in phophate glass material and the pump absorption efficiency will be high in the practical amplifier system so long as proper side pumping scheme and gain medium design are used to try to realize the absorbed pump distribution determined and used in the simulation.

Figure 5:
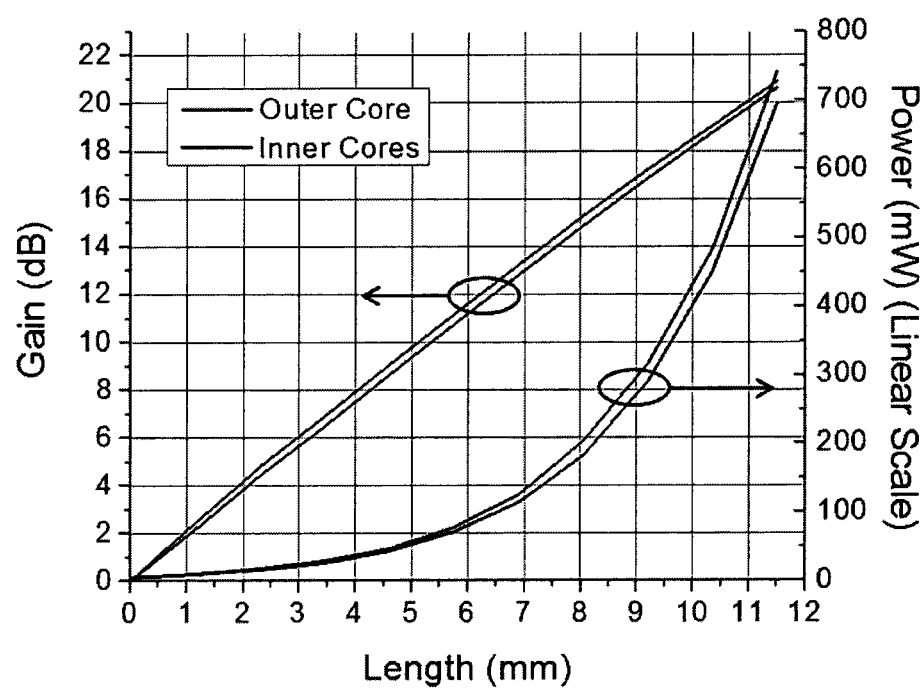
FIG. 5 is a graph that plots the power evolution of signals transmitted during the simulation.

The power evolution of the signal beams along the length of the amplifier gain medium given by the simulation is shown in FIG. 5 for a total pump power of 15 W. At the output of the bulk amplifier the central beam was amplified to 742 mW and the outer beams were amplified to 696 mW, which resulted in a ~20.9 dB gain for the center core and a ~20.6 dB gain for the outer cores. This corresponds to an overall optical power conversion efficiency of 32.5%. The signal from the center core experienced slightly higher gain than the other channels as the signal and pump overlap is maximum. The gain for the cores can be equalized by properly adjusting the parameters for this amplifier system, such as the absorbed pump distribution.

Figure 6A:
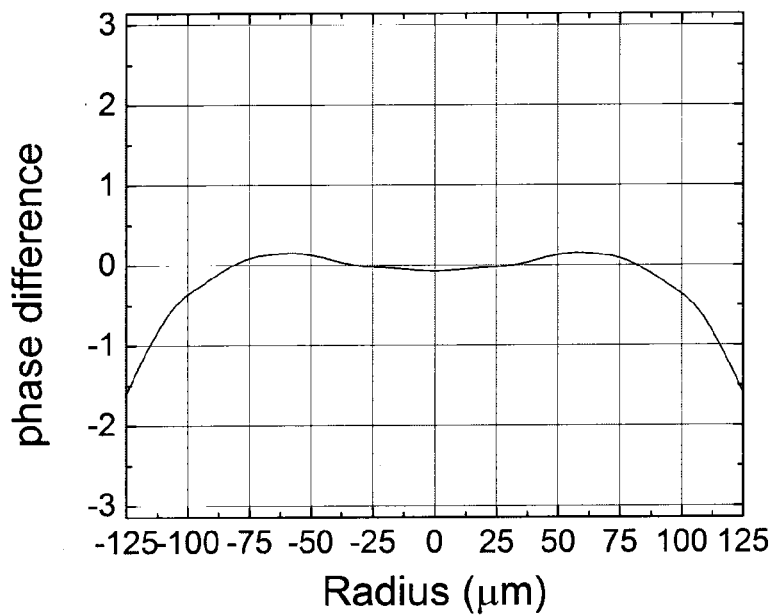
FIGS. 6A and 6B are graphs that plot the spatial phase difference of the center beam and one of the outer beams, respectively.
Figure 6B:
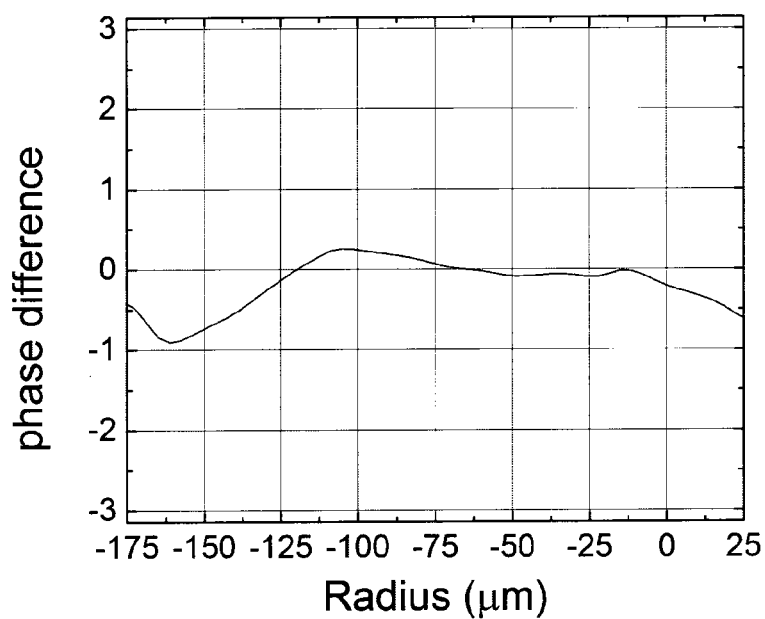

After amplification, the signals need to be coupled back to the individual cores by the second imaging system (see, e.g., FIG. 2). To do so, the amplified signal wavefront after amplification needs to be as undistorted as possible to reduce coupling loss. According to the simulation, the spatial phase degrades after the signal passes the gain medium. The spatial phase may also degrade due to any imperfections in a practical amplifier system. FIG. 6 shows the difference between the phase of the calculated output signal beam and the phase of the same calculated output signal beam but without gain or absorption in the medium (only pure phosphate glass assumed). FIG. 6A is the phase difference for the center beam, and FIG. 6B is the phase difference for one of the outer beams. In the system, the wavefront degradation might result from the narrow gain region and non-uniform gain saturation. The wavefront can be corrected easily by using a phase plate.

Figure 7A:
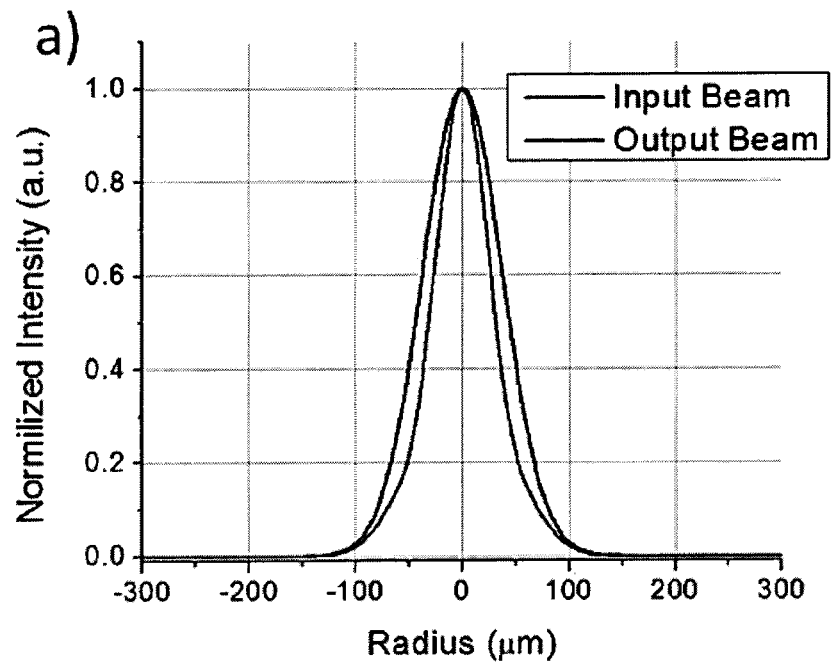
FIGS. 7A and 7B are graphs that plot the intensity profile of the center beam and one of the outer beams, respectively, before and after amplification.
Figure 7B:
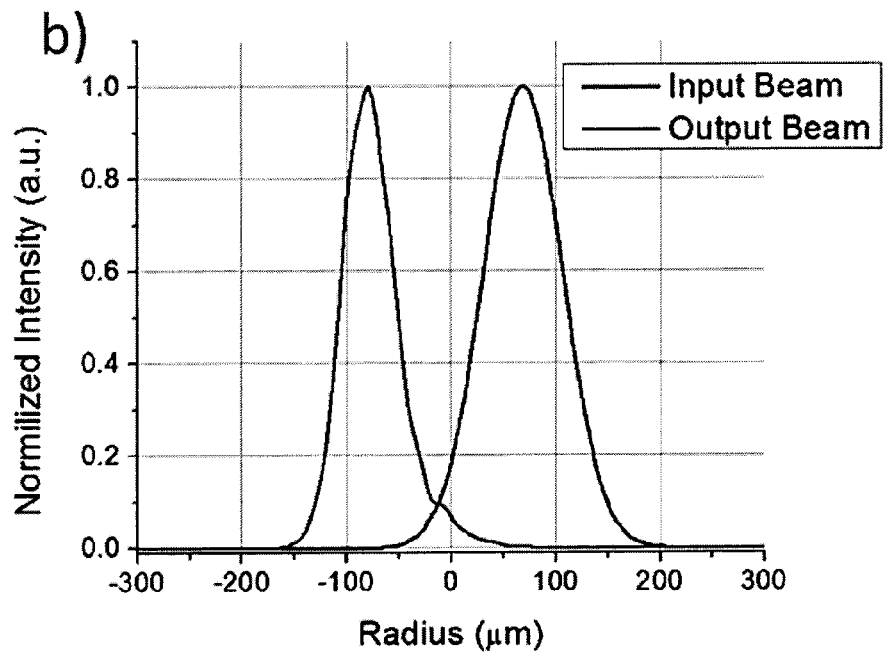

The intensity profiles of the center beam and one of the outer beams are also shown in FIGS. 7A and 7B, respectively. The intensity profile of the outer beam changed sides with respect to the center after passing the amplifier, as expected. Both the outer and center beam intensity profiles also show some narrowing due to the gain dynamics of the bulk amplifier.

The imaging amplifier method described above exploits the parallelism of bulk optics to provide the additional degrees of freedom necessary for the amplification of signals from multi-core and multimode fibers. It is possible to build a multimode EDFA (simply by replacing the single-mode erbium-doped fiber with a multimode erbium-doped fiber) for optical transmission in multimode fiber. The benefit of exploiting such parallelism is significant savings in component count in comparison with using dedicated EDFAs for each core.

If there are more than seven cores in the multi-core fiber, for example nineteen cores or even more, and each core is a multimode core that can support several eigenmodes, the power conversion efficiency of the disclosed imaging amplifiers could be even higher. Since increasing number of cores and number of eigenmodes supported by each core make it easy to further increase the total input power for all the signal beams, this is helpful to further increase the optical power conversion efficiency for the imaging amplifier as applied to space-multiplexed optical transmission system. According to the simulation that was performed, an optical power conversion efficiency (OPCE) as high as about 50% might be achieved using the imaging amplifier if there are nineteen cores in the multi-core fibers with each core supporting several eigenmodes.

Another way to increase the total input power for all signal beams for the imaging amplifier is to add a pre-amplifier. If the power for each beam from each core of the multi-core fiber is 2 mW, which is typical for a large channel count WDM transmission system, it is not be difficult to amplify it to 16 mW using a pre-amplifier. The overall OPCE will be dominated by the power amplifier stage.

Compared to erbium-doped fiber amplifiers (EDFAs), the potential benefits of the disclosed imaging amplifiers are attractive. It is simple, since one imaging amplifier can be used to amplify signals from many cores, with each core supporting one or several spatial modes. If multi-core fibers with more cores and thus higher total input power are used in space-multiplexed optical transmission, the OPCE can be increased further.

Figure 8:
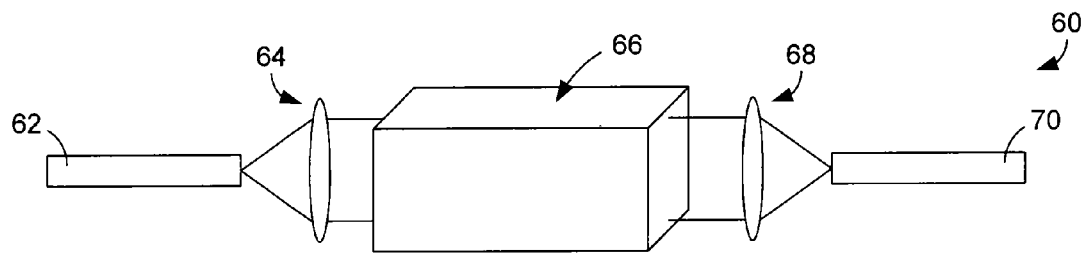
FIG. 8 is a schematic drawing of a third embodiment of an optical system that provides amplification to space-multiplexed optical signals.

FIGS. 8-14 illustrate multiple examples of optical systems that provide amplification to space-multiplexed optical signals. Because the systems utilize image amplification, they can alternatively be referred to as image amplifying systems or image amplifiers. Beginning with FIG. 8, illustrated is an optical system 60 comprising an input fiber 62, a first lens 64, a bulk amplifier 66 that comprises a gain medium, a second lens 68, and an output fiber 70. The input and output fibers 62, 70 are substantially identical fibers. For example, both fibers 62, 70 are the same multimode fibers or the same multi-core fibers. The first and second lenses 64, 68 can be individual lenses or groups of lenses. The bulk amplifier 66 comprises a single mass of material, such as silica or phosphate glass, that is doped with an appropriate amplifying medium, such as erbium, erbium/ytterbium, or any other element or elements that provide gain at the signal wavelength. Although the amplifier 66 is illustrated as a block of material in FIG. 8, it is noted that alternative shapes are possible. For example, the amplifier 66 can be formed as a rod of material. Regardless, the length dimension of the amplifier 66 is small. By way of example, the amplifier 66 can have a length on the order of tens of millimeters along the optical axis of the system 60.

Figure 9:
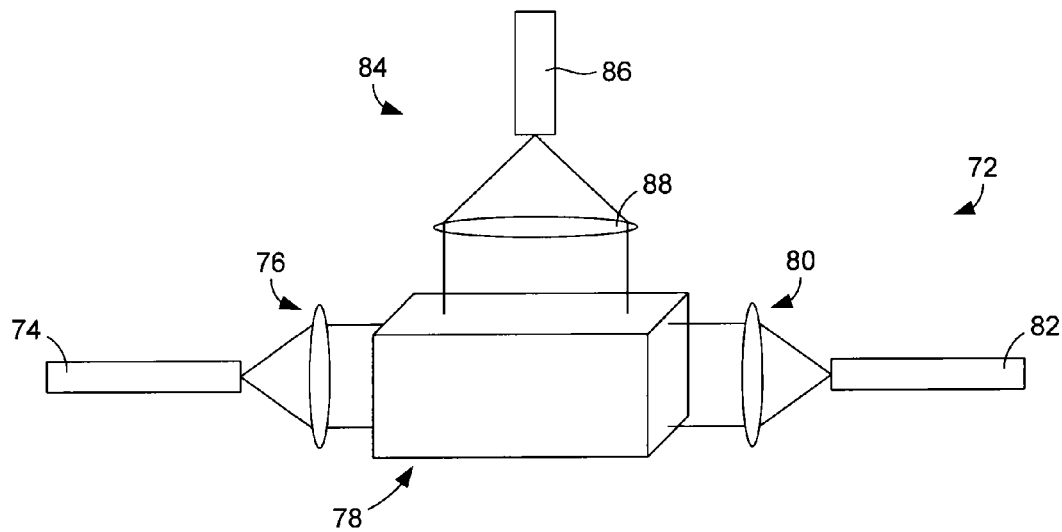
FIG. 9 is a schematic drawing of a fourth embodiment of an optical system that provides amplification to space-multiplexed optical signals.

FIG. 9 illustrates an optical system 72 that incorporates a side pumping scheme. The system 72 is similar to the system 60 of FIG. 8 and therefore includes an input fiber 74, a first lens 76, a bulk amplifier 78, a second lens 80, and an output fiber 82. In addition, the system 72 includes a side pump 84, which includes an optical fiber 86 and a lens 88, as well as a pump diode (not shown). The lens 88 can be a circular lens, a cylindrical lens, or another type of lens.

Figure 10:
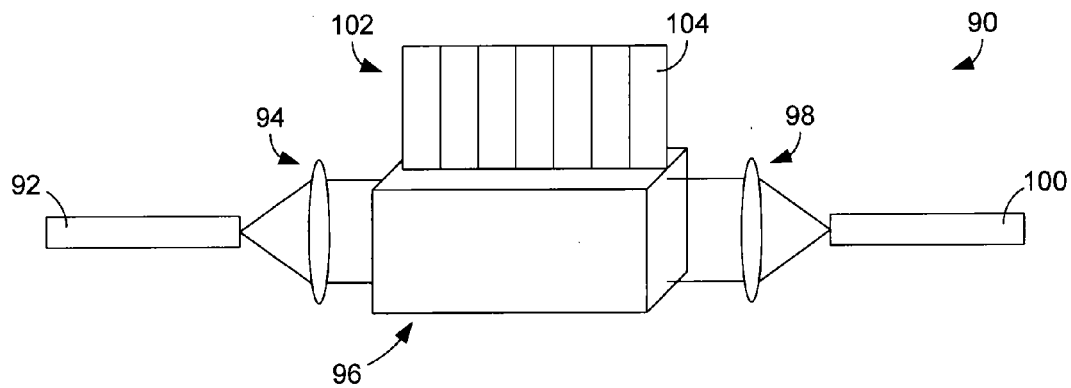
FIG. 10 is a schematic drawing of a fifth embodiment of an optical system that provides amplification to space-multiplexed optical signals.

FIG. 10 illustrates a further optical system 90 that incorporates a side pumping scheme. The system 90 includes an input fiber 92, a first lens 94, a bulk amplifier 96, a second lens 98, and an output fiber 100. In addition, the system 90 includes a side pump 102, which includes an array 104 of optical fibers that are individually driven by multiple pump diodes (not shown). By using multiple pump diodes, greater amplification can be provided.

Figure 11:
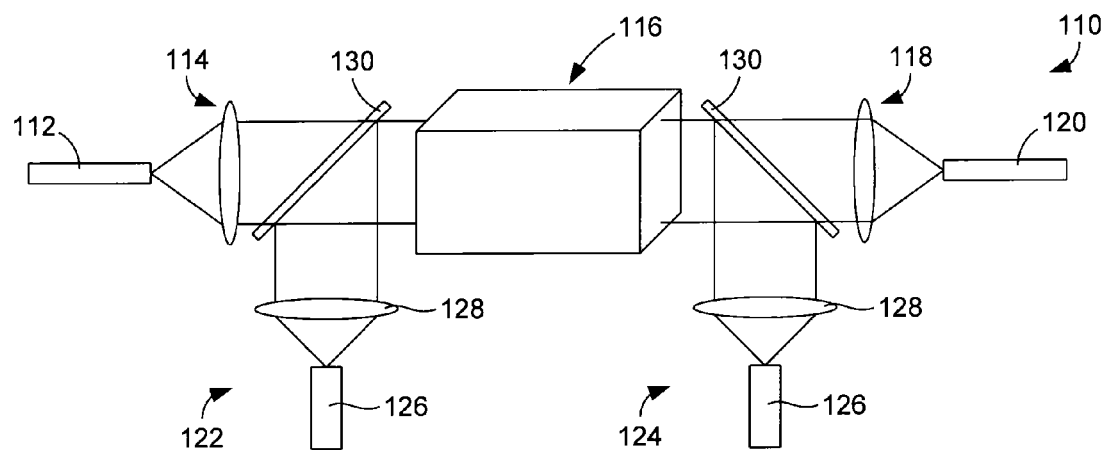
FIG. 11 is a schematic drawing of a sixth embodiment of an optical system that provides amplification to space-multiplexed optical signals.

FIG. 11 illustrates an optical system 110 that incorporates a longitudinal (parallel) pumping scheme. The system 110 includes an input fiber 112, a first lens 114, a bulk amplifier 116, a second lens 118, and an output fiber 120. In addition, the system 110 includes first and second parallel pumps 122 and 124. The first parallel pump 122 delivers power to the amplifier 116 to its input end and the second parallel pump 124 delivers power to the amplifier to its output end. As shown in FIG. 11, the pumps 122, 124 can be coupled to the system 110 using free space optics. In this case, the pumps 122, 124 each comprise an optical fiber 126, a lens 128, and beam splitters (e.g., half mirrors) 130.

Figure 12:
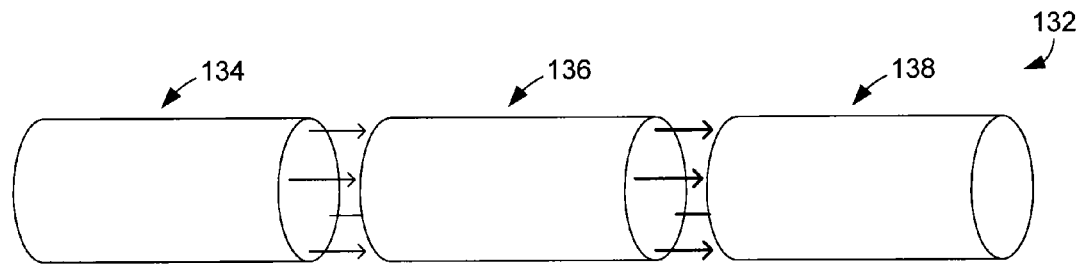
FIG. 12 is a schematic diagram of an embodiment of a gain medium.

With reference next to FIG. 12, illustrated is an optical system 132 comprising an input fiber 134, an output fiber 138, and a doped gradient-index (GRIN) lens 136 positioned between the two fibers. In such an embodiment, the GRIN lens 136 both images signals from the input fiber 134 onto the output fiber 138 and amplifies the signals. The GRIN lens 136 therefore serves the purpose of the amplifier and lenses of the systems illustrated in FIGS. 8-11. The GRIN lens 136 can be pumped in similar manner to that shown in FIGS. 8-11 (i.e., side or longitudinal pumping). It is noted that, doped conventional lenses could be used in lieu of the GRIN lens 136.

Figure 13:
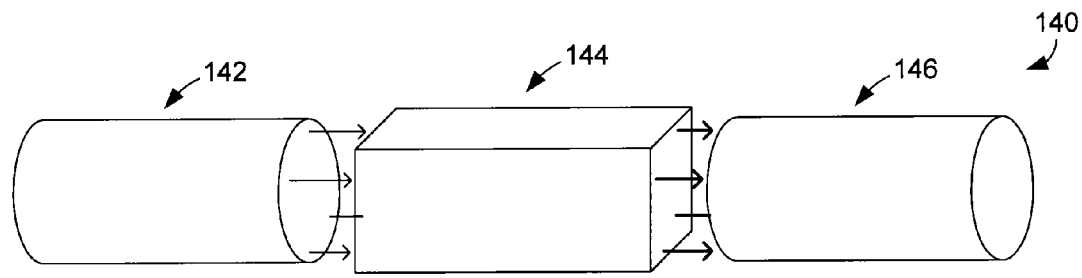
FIG. 13 is a schematic diagram of a further embodiment of a gain medium.

FIG. 13 illustrates an optical system 140 comprising an input fiber 142, an output fiber 146, and a doped two-dimensional waveguide 144 positioned between the two fibers. The two-dimensional waveguide 144 provides periodic self-imaging due to the multimode interference (MMI) it provides. As with the GRIN lens 136, the waveguide 144 can be pumped in similar manner to that shown in FIGS. 8-11.

Figure 14A:
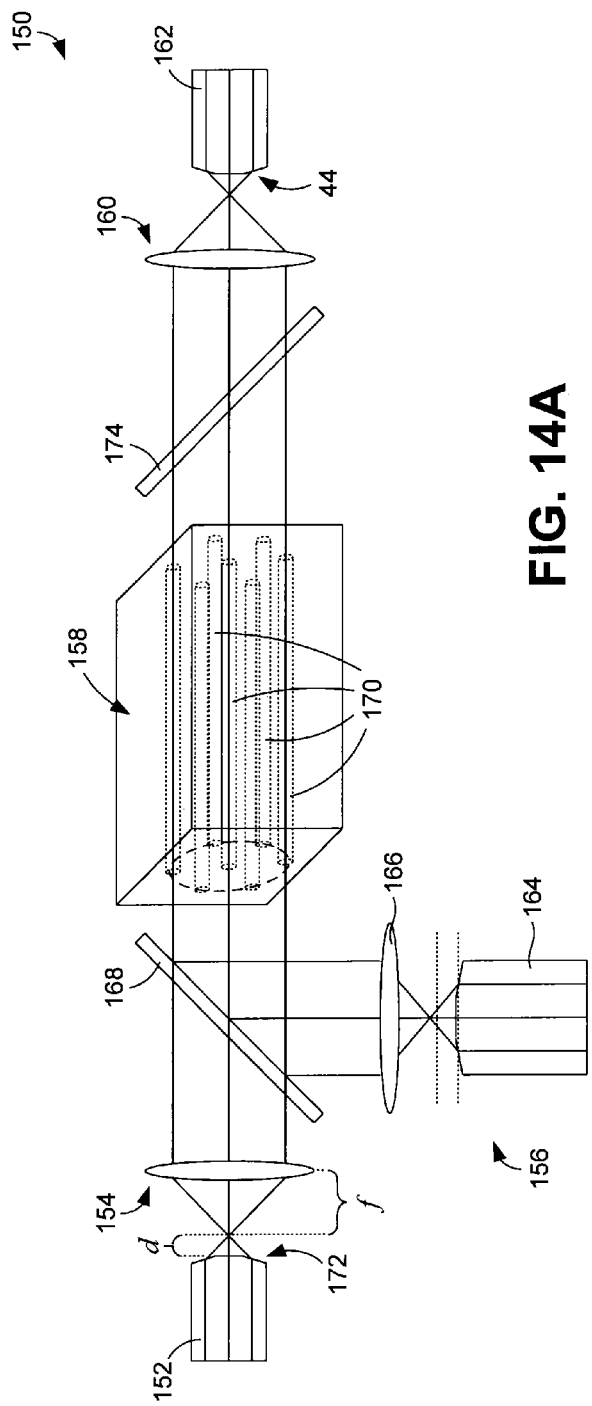
FIG. 14A is a schematic drawing of a seventh embodiment of an optical system that provides amplification to space-multiplexed optical signals.

FIG. 14A shows another optical system 150. The system 150 includes an input fiber 152, a first lens 154, a parallel pump 156, a bulk amplifier 158, a second lens 160, and output fiber 162. The parallel pump 156 includes an optical fiber 164, a lens 166, and a beam splitter 168. The fibers 152, 162 each comprise a multi-core fiber having seven cores. There are seven discrete doped regions 170 that act as gain media within the bulk amplifier 158 that are aligned with the propagation paths of the seven cores of the fibers. The seven doped regions 170 can form a seven-channel, two-dimensional waveguide to increase the diffraction-free interaction length for amplification. In this technique, the image of the input fiber facet is magnified by a factor of (f/d) and mapped onto the input facet of the two-dimensional waveguide, where f is the focal length of the lens 154 and d is the distance between the input fiber 152 and its focal point.

Figure 14B:
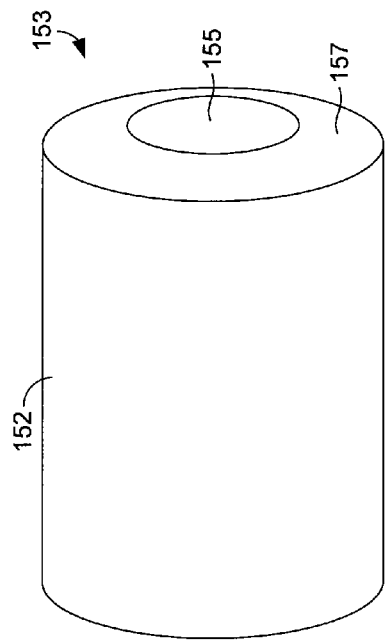
FIG. 14B is a schematic drawing of an embodiment of an input fiber that can be used in the system of FIG. 14A.

The beams from the individual channels are tilted by the end of the input fiber 152, which is convex and faceted. FIG. 14B provides a detail view of the input fiber 152 and its convex, faceted end. As is shown in that figure, the output end 153 of the fiber 152 includes a central circular facet 155 that is perpendicular to the optical axis of the system and an outer circular facet 157 that is angled backward so as to form the convex shape. As is apparent from FIG. 14A, the facets enable parallel beams to be sent to the bulk amplifier 158. Similar, complimentary facets are formed on the ends of the output fiber 162 and the pump fiber 164. The amplified signal from the two-dimensional waveguide output is coupled back to the output fiber 162 after passing through an optical filter 174, which eliminates unused pump light. Using single lens for input, output, and pump light reduces the required optical elements significantly, which means lower cost, higher durability, and greater rigidity. It is noted that while single parallel pumping is illustrated in FIG. 14A, side pumping or bi-directional pumping could alternatively be used.

Figure 15:
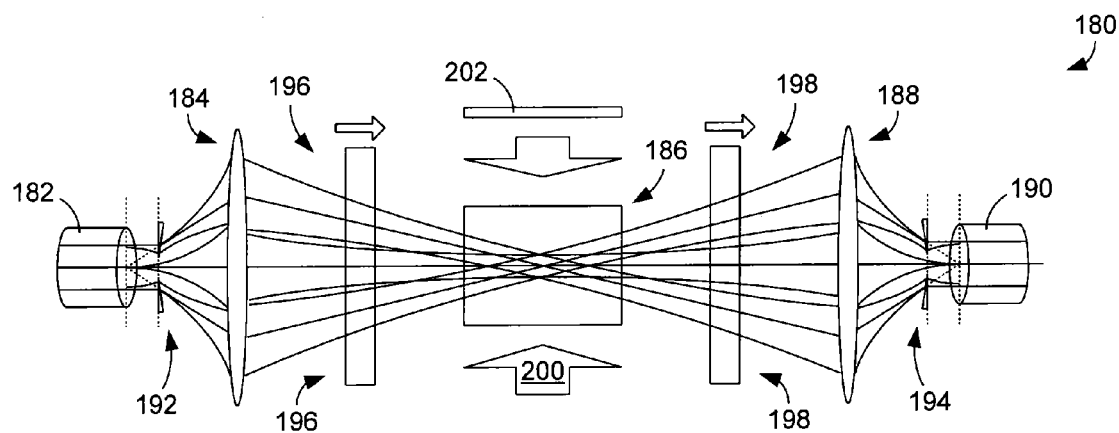
FIG. 15 is a schematic drawing of an eighth embodiment of an optical system that provides amplification to space-multiplexed optical signals.

FIGS. 15-26 illustrate example imaging and amplifying architectures that can be used to amplify space-multiplexed optical signals using image amplification. Each of those architectures can be used for multimode or multi-core fibers. FIG. 15 illustrates an optical system 180 that is similar to the system 26 of FIG. 2A. The system 180 includes an input fiber 182, a first lens 184, a bulk amplifier 186, a second lens 188, and an output fiber 190. In addition, the system 180 includes wedge prisms 192 and 194, as well as isolators 196 and 198, which prevent backward propagation of light. The bulk amplifier 186 is pumped with pump light 200. Any unabsorbed pump light can be sent back to the amplifier 186 (i.e., recycled) using a reflector 202. FIG. 15 also illustrates the expansion of the light beams after they leave the input fiber 182.

Figure 16:
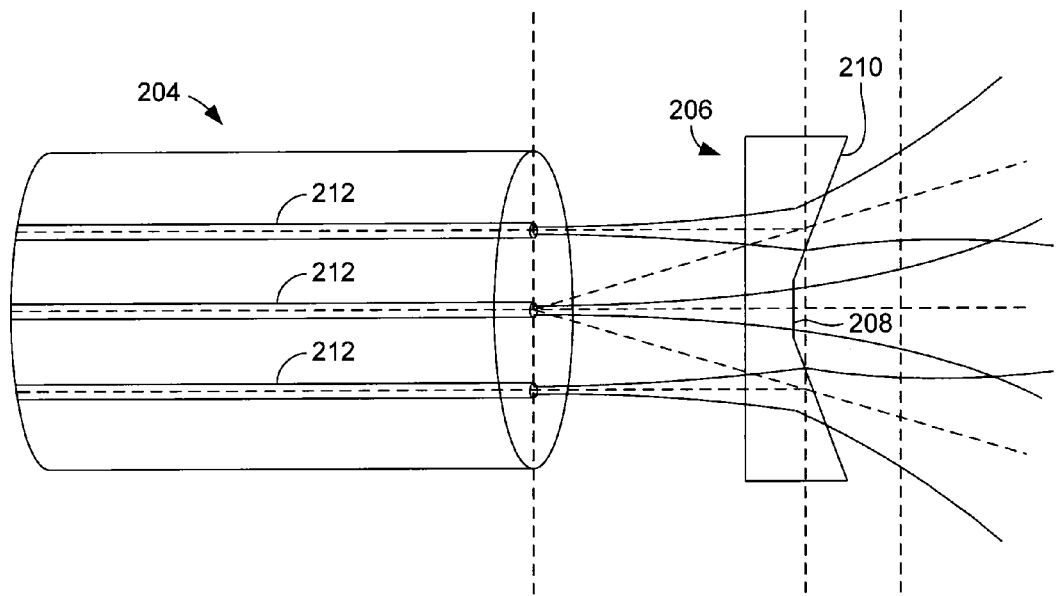
FIG. 16 is a schematic drawing of embodiments of an optical fiber and a wedge prism that can be used in an optical system that provides amplification to space-multiplexed optical signals.

FIG. 16 shows a multi-core optical fiber 204 and a wedge prism 206 that, for example, can be used in the system of FIG. 15. As is shown in FIG. 16, the prism 206 includes a central facet 208 that is perpendicular to the optical axis and an outer facet 210 that is angled forward so as to form a concave shape. The prism 206 can be used to tilt off-axis beams from individual cores 212 of the fiber 204.

Figure 17:
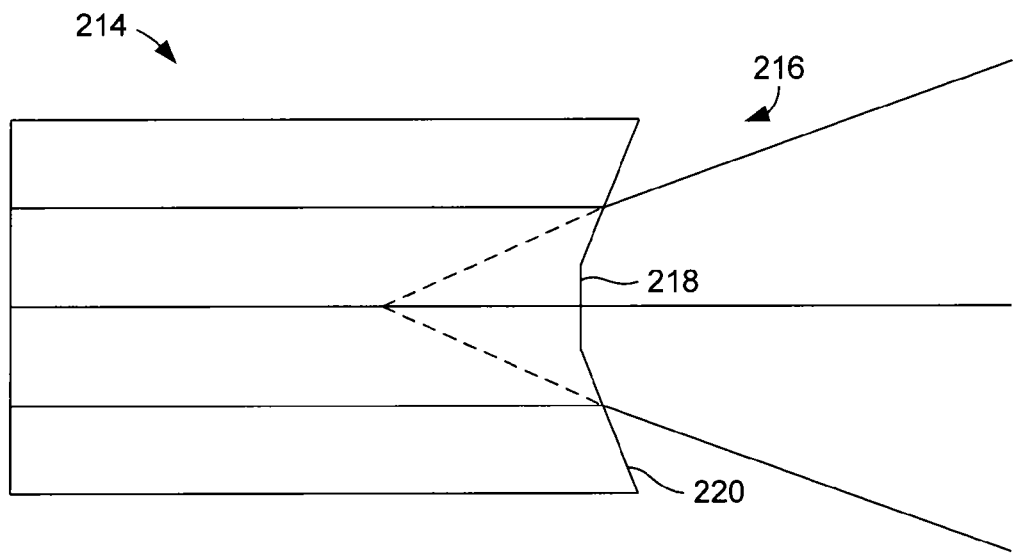
FIG. 17 is a schematic drawing of an embodiment of an optical fiber that can be used in an optical system that provides amplification to space-multiplexed optical signals.

FIG. 17 shows an alternative configuration to that shown in FIG. 16. In FIG. 17, an optical fiber 214 has an end 216 that includes a central facet 218 that is perpendicular to the optical axis and an outer facet 220 that is angled forward so as to form a concave shape. Accordingly, the fiber 214 reflects an integration of the fiber 204 and the wedge prism 206 of FIG. 16.

Figure 18:
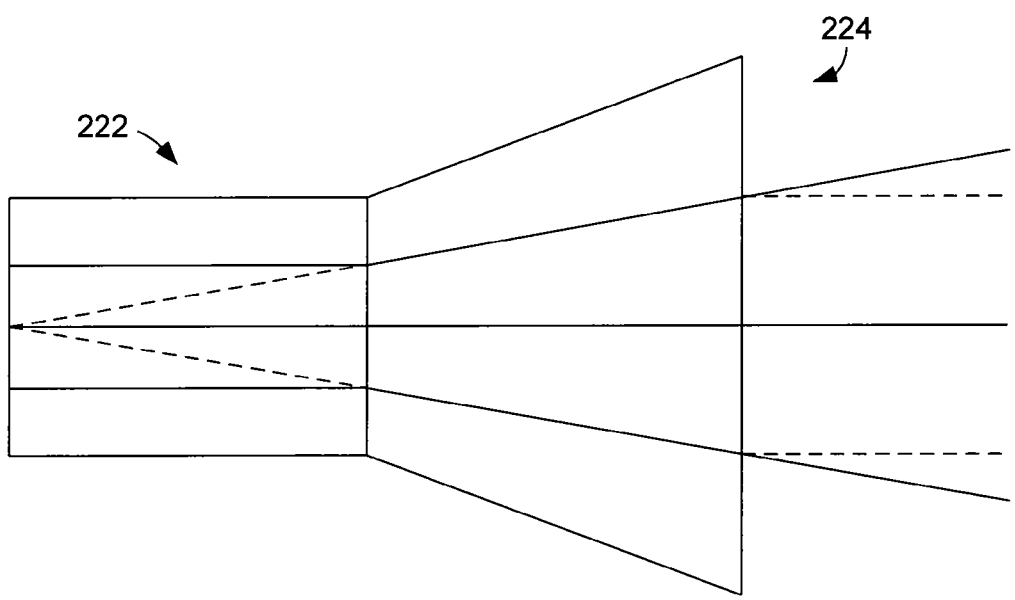
FIG. 18 is a schematic drawing of a further embodiment of an optical fiber that can be used in an optical system that provides amplification to space-multiplexed optical signals.

FIG. 18 shows a further alternative configuration for beam tilting. In FIG. 18, an optical fiber 222 includes a frustoconical end 224 that causes the off-axis beams to tilt.

Figure 19:
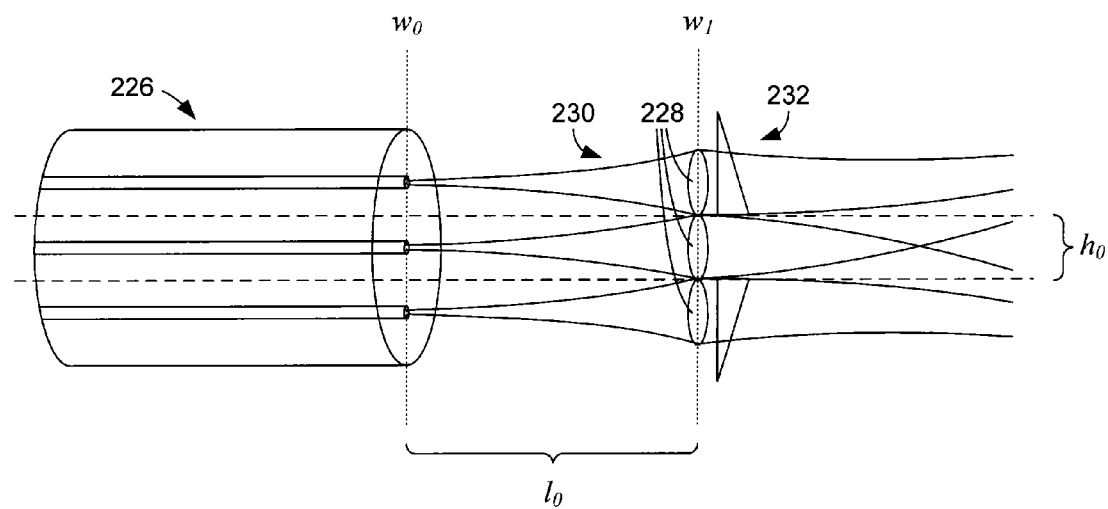
FIG. 19 is a schematic drawing of embodiments of an optical fiber and a micro lens array that increases the beam size and therefore decreases divergence inside the amplifier.

It is useful to control the divergence of the beams that travel inside the amplifying medium. That divergence is related to the waist size of the beams. A lens array can be used to adjust the beam waist and, as a result, beam divergence. FIG. 19 illustrates this. As is shown in that figure, beams from a multi-core optical fiber 226 are received by microlenses 228 of a microlens array 230 that is positioned before a wedge prism 232. The array 230 increases the beam size and therefore decreases divergence inside the amplifier. The focal lengths of the micro lenses are $l_0$.

Figure 20:
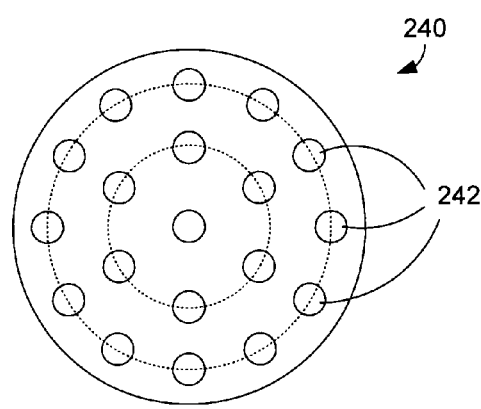
FIG. 20 is an end view of an embodiment of a multi-core optical fiber.
Figure 21:
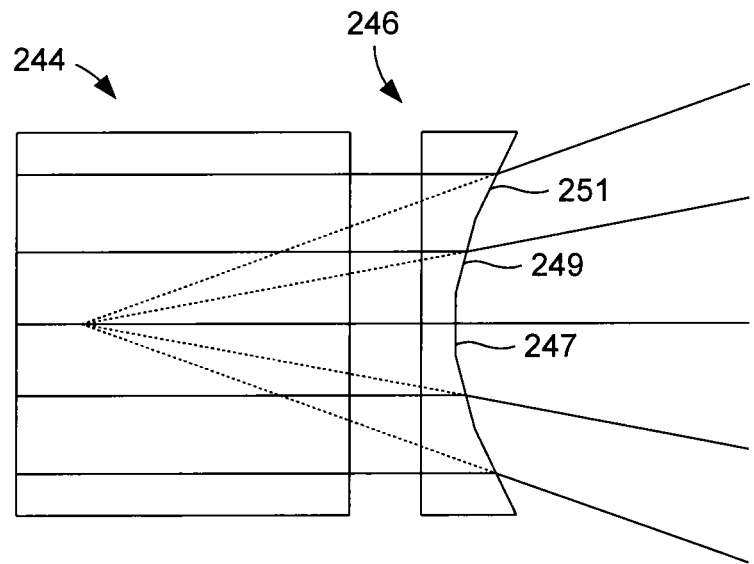
FIG. 21 is a schematic drawing of embodiments of an optical fiber and a wedge prism.
Figure 22:
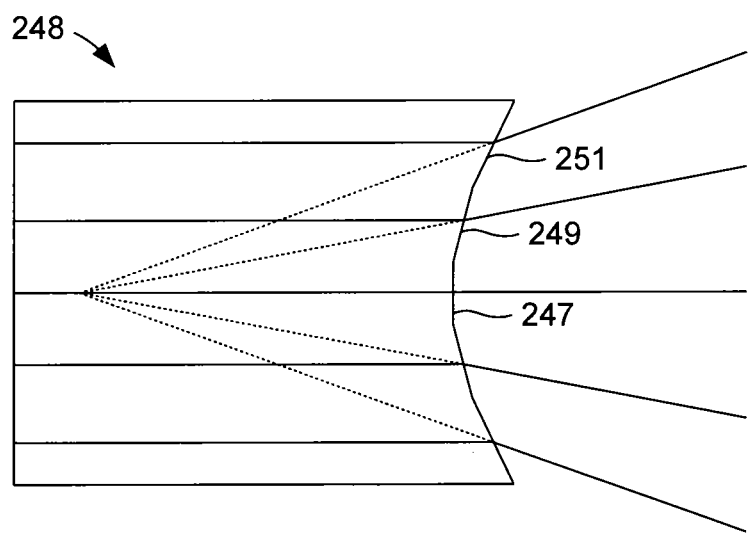
FIG. 22 is a schematic drawing of an embodiment of an optical fiber that incorporates facets of the wedge prism shown in FIG. 21.

If the number of cores is increased, the tilting of the beam direction can simply be extended. FIG. 20 illustrates a multi-core fiber 240 having 19 cores 242. Off-axis beams from those cores 242 can be tilted as shown in FIG. 21 with an optical fiber 244 and a separate wedge prism 246 configuration, or as shown in FIG. 22 with an optical fiber 248 that integrates the functionality of the prism. As is shown in both of those figures, the prism 246 or fiber 248 can include a center facet 247, an intermediate facet 249, and an outer facet 251.

Figure 23:
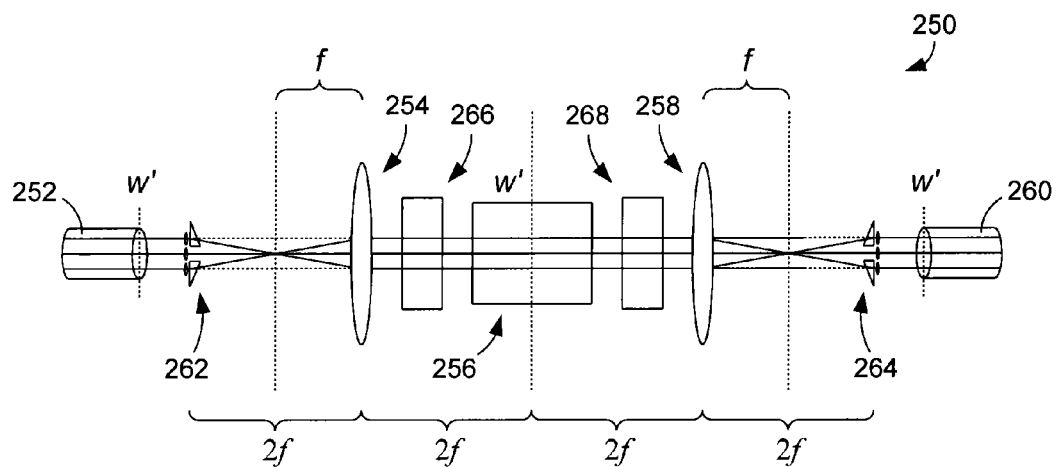
FIG. 23 is a schematic drawing of a ninth embodiment of an optical system that provides amplification to space-multiplexed optical signals.

FIG. 23 illustrates a 4-f version of an optical system 250 that includes an input fiber 252, a first lens 254, a bulk amplifier 256, a second lens 258, and an output fiber 260. In addition, the system 180 includes microlens arrays and wedge prisms 262 and 264, as well as isolators 266 and 268.

Figure 24:
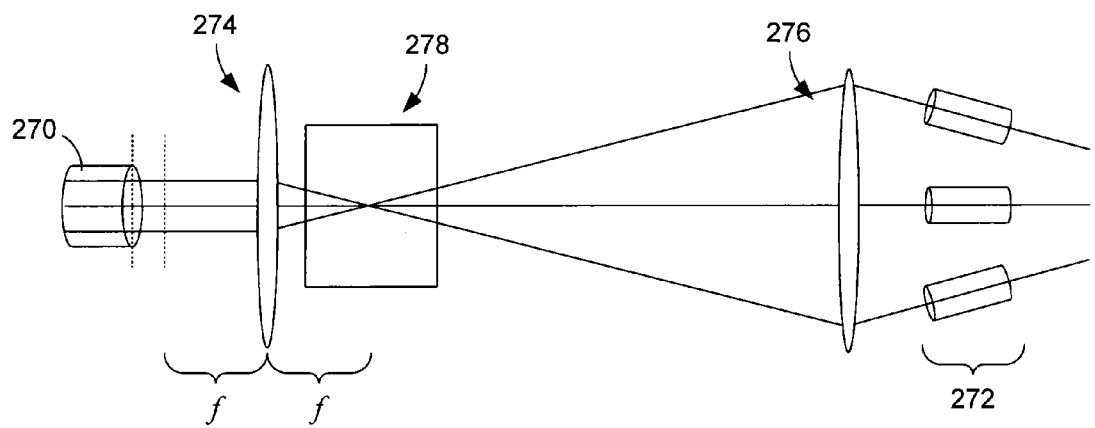
FIG. 24 is a schematic drawing of a tenth embodiment of an optical system that provides amplification to space-multiplexed optical signals.

In the above-described embodiments, it has been assumed that the output fiber is the same type of fiber as the input fiber. It is noted that this does not need to be the case. FIG. 24 illustrates an alternative arrangement in which beams from a multi-core input fiber 270 are separately received by separate output fibers 272. As with the other described optical systems, the system shown in FIG. 24 includes a first lens 274, a bulk amplifier 278, and a second lens 276.

As indicated above, the disclosed embodiments are only example embodiments of the disclosed inventions. Other alternatives are possible. For example, while the focus of the disclosure has been upon multimode and multi-core optical fibers, it is noted that other optical fibers that can be used in space-multiplexing, such as fiber bundles, could be used. Moreover, it is noted that the cores of the multi-core fiber or fiber bundle can support a single spatial mode or multiple spatial modes.

The invention claimed is:

1. A space-division multiplexed optical system for amplifying space-multiplexed optical signals, the system comprising:
a multi-mode or multi-core input fiber that propagates multiple spatially-separated optical signals, wherein each of the spatially-separated optical signals comprises a plurality of different wavelengths; and
a bulk amplifier comprising a mass of doped material that receives the multiple wavelength, multiple spatially-separated optical signals and simultaneously amplifies those signals to generate multiple amplified signals, wherein the bulk amplifier comprises no other material.

2. The optical system of claim 1, further comprising an output fiber that receives the multiple amplified signals from the amplifier.

3. The system of 1, wherein the input fiber is a multimode fiber, multi-core fiber, or a fiber bundle.

4. The system of 3, wherein the input fiber is a multi-core fiber having multiple cores and at least one of the cores supports multiple spatial modes.

5. The system of claim 1, wherein the bulk amplifier is made of phosphate glass.

6. The system of claim 5, wherein the phosphate glass is doped with erbium or erbium/ytterbium.

7. The system of claim 6, wherein a doping concentration of the phosphate glass is uniform.

8. The system of claim 6, wherein a doping concentration of the phosphate glass is non-uniform.

9. The system of claim 1, further comprising a lens positioned between the input fiber and the bulk amplifier.

10. The system of claim 9, further comprising an isolator positioned between the lens and the amplifier.

11. The system of claim 9, further comprising a wedge prism positioned between the input fiber and the lens that tilts off-axis light beams from the fiber.

12. The system of claim 1, further comprising a microlens that changes the size of the light beams that exit the input fiber.

13. The system of claim 1, further comprising a pump that pumps the bulk amplifier.

14. The system of claim 13, wherein the pump is a side pump.

15. The system of claim 13, wherein the pump is a longitudinal pump.

16. The system of claim 13, further comprising a reflector that reflects pump energy that is not absorbed by the bulk amplifier back to the bulk amplifier.

17. The system of claim 1, wherein the bulk amplifier is a doped gradient-index lens.

18. The system of claim 1, wherein the input fiber has angled output facets that tilt off-axis beams of light as they exit the fiber.

19. The system of claim 1, further comprising a filter positioned downstream of the bulk amplifier that filters out unused pump light.

20. A space-division multiplexed optical system for amplifying space-multiplexed optical signals, the system comprising:
a multi-core input fiber that comprises multiple cores, each core being configured to propagate a separate optical signal comprises a plurality of different wavelengths;
a doped bulk amplifier comprised of a mass of material that receives the optical signals from the input fiber and simultaneously amplifies those signals to generate multiple amplified signals, wherein the bulk amplifier comprises no other material;
a multi-core output fiber having the same number of cores as the input fiber, wherein each core receives an amplified signal from the amplifier;
a first lens positioned between the input fiber and the bulk amplifier; and
a second lens positioned between the bulk amplifier and the output fiber.

21. The system of claim 20, wherein the bulk amplifier is made of phosphate glass that is doped with erbium or erbium/ytterbium.

22. The system of claim 20, further comprising a first isolator positioned between the first lens and the bulk amplifier and a second isolator positioned between the bulk amplifier and the second lens.

23. The system of claim 20, further comprising a first wedge prism positioned between the input fiber and the first lens and a second wedge prism positioned between the second lens and the output fiber.

24. The system of claim 20, further comprising a pump that pumps the bulk amplifier.

25. The system of claim 24, further comprising a reflector that reflects pump energy that is not absorbed by the bulk amplifier back to the bulk amplifier.

26. The system of claim 20, wherein an output end of the input fiber has angled output facets and an input end of the output fiber has complimentary angled input facets.

27. A method for amplifying space-multiplexed optical signals, the method comprising:
simultaneously amplifying multiple spatially-separated optical signals comprising multiple different wavelengths using a bulk amplifier comprising a mass of doped material, wherein the bulk amplifier comprises no other materials.

28. The method of claim 27, further comprising delivering the multiple signals to the bulk amplifier using a multimode fiber, multi-core fiber, or a fiber bundle.

* * * * *